United States Patent [19]

Webb et al.

[11] Patent Number: 4,485,486

[45] Date of Patent: Nov. 27, 1984

[54] METHOD AND APPARATUS FOR ASSIGNING DUPLEX RADIO CHANNELS AND SCANNING DUPLEX RADIO CHANNELS ASSIGNED TO MOBILE AND PORTABLE RADIO TELEPHONES IN A CELLULAR RADIOTELEPHONE COMMUNICATIONS SYSTEM

[75] Inventors: Ronald J. Webb, Elgin; Larry C. Puhl, Sleepy Hollow, both of Ill.

[73] Assignee: Motorola, Inc., Schaumburg, Ill.

[21] Appl. No.: 576,805

[22] Filed: Feb. 6, 1984

Related U.S. Application Data

[63] Continuation of Ser. No. 405,210, Aug. 3, 1982, abandoned.

[51] Int. Cl.³ .................. H04B 3/60; H04M 7/00; H04Q 7/04
[52] U.S. Cl. .................. 455/33; 179/2 EB; 455/56; 455/62
[58] Field of Search .................. 455/33, 34, 53, 54, 455/56, 62; 179/2 EB

[56] References Cited

U.S. PATENT DOCUMENTS

| | | | |
|---|---|---|---|
| 2,985,755 | 5/1961 | Giesselman . | |
| 3,155,909 | 11/1964 | Shepherd . | |
| 3,328,698 | 6/1967 | Schreder . | |
| 3,663,762 | 5/1972 | Joel, Jr. . | |
| 3,761,822 | 9/1973 | Richardson et al. . | |
| 3,764,915 | 10/1973 | Cox et al. . | |
| 3,819,872 | 6/1974 | Hamrick . | |
| 3,906,166 | 9/1975 | Cooper et al. . | |
| 3,913,017 | 10/1975 | Imaseki . | |
| 3,937,943 | 2/1976 | DeBrunner et al. . | |
| 3,962,553 | 6/1976 | Linder et al. . | |
| 3,984,776 | 10/1976 | Stedman . | |
| 4,025,853 | 5/1977 | Addeo . | |
| 4,054,786 | 10/1977 | Vincent | 364/575 |
| 4,092,600 | 5/1978 | Zimmermann et al. . | |
| 4,101,836 | 7/1978 | Craig et al. . | |
| 4,144,412 | 3/1979 | Ito et al. | 179/2 EB |
| 4,144,496 | 3/1979 | Cunningham et al. | 455/33 |
| 4,268,722 | 5/1981 | Little et al. | 179/2 EB |
| 4,302,845 | 11/1981 | McClaughry et al. | 375/82 |
| 4,309,773 | 1/1982 | Johnson et al. | 455/62 |
| 4,312,074 | 1/1982 | Pautler et al. | 375/96 |
| 4,317,229 | 2/1982 | Craig et al. | 455/277 |

OTHER PUBLICATIONS

National Semiconductor, "ADC0801, ADC0802, ADC0803, ADC0804 8–Bit μP Compatible A/D Converters", Jan. 1981, pp. 1–3, 14–19.

"Motorola DYNATAC Cellular Radiotelephone Systems", Motorola, Inc., Schaumburg, IL, 1982.

"DYNATAC Cellular Mobile Telephone System Base Station", Motorola Instruction Manual No. 68P81060E30, Motorola, Inc., Schaumburg, IL, 1981.

*Primary Examiner*—Marc E. Bookbinder
*Attorney, Agent, or Firm*—Rollan R. Hackbart; Edward M. Roney; James W. Gillman

[57] ABSTRACT

A unique method and apparatus for efficiently assigning duplex radio channels and scanning duplex radio channels assigned to mobile and portable radiotelephones in a cellular communications system is described. Each cell includes a base station radio having a signalling channel and a plurality of voice channels, and a base site controller adapted to utilize the methods embodying the present invention for controlling communications paths to mobile and portable radiotelephones. The base station radios include a signalling transceiver operable on the signalling channel, a plurality of voice transceivers each operable on a voice channel, and a scanning receiver for sampling the signal strength of active radiotelephones. Transmitters of signalling transceivers and voice transceivers are combined and coupled to an omnidirectional antenna; and the receivers of the signalling transceiver, voice transceivers and scanning receiver are couplable to one or more of six sector antennas. In practicing the methods of the present invention, the microprocessor controlled base site controller maintains high quality communications paths to mobile and portable radiotelephones by periodically monitoring their signal strength and when signal strength degradations are detected, either changing the base station sector antennas coupled to voice transceivers, increasing or decreasing radiotelephone power output, or handing radiotelephones off to another cell.

67 Claims, 7 Drawing Figures

METHOD AND APPARATUS FOR ASSIGNING DUPLEX RADIO CHANNELS AND SCANNING DUPLEX RADIO CHANNELS ASSIGNED TO MOBILE AND PORTABLE RADIO TELEPHONES IN A CELLULAR RADIOTELEPHONE COMMUNICATIONS SYSTEM

This is a continuation of application Ser. No. 405,210, filed Aug. 3, 1982 now abandoned.

RELATED PATENT APPLICATIONS

The present invention is related to co-pending U.S. patent application Ser. No. 405,123, (corresponding to PCT application No. 83/01180) entitled "Method and Apparatus for Measuring the Strength of a Radio Frequency Signal", invented by Michael F. McLaughlin, and assigned to same assignee as and filed the same date as the instant invention. By reference thereto, the foregoing related U.S. patent application is incorporated in its entirety into the written description of the present invention.

BACKGROUND OF THE INVENTION

The present invention relates generally to radiotelephone communications systems, and more particularly to an improved method and apparatus for assigning duplex radio channels and scanning duplex radio channels assigned to mobile and portable radiotelephones in cellular radiotelephone communications systems.

Prior art radiotelephone communications systems typically included a single, high power base station for covering a large geographical service area, for example, a large city and its surrounding metropolitan area. The base station was centrally located and included a plurality of duplex radio channels for providing communications paths to radiotelephones anywhere in the system. Supervision of the radio channels was relatively simple and was typically performed by a centrally located control terminal. However, the expansion of service in such radiotelephone communications systems was limited since additional radiotelephones could only be accommodated by adding more duplex radio channels, the availability of which is limited and controlled by governmental regulation.

In order to increase the capacity of radiotelephone communications systems, the geographical service area of some radiotelephone communications systems was divided into a plurality of cells, each of which included a base station having a plurality of duplex radio channels. Since the transmitters of such base stations were operated at relatively low power, duplex radio channels could be reused in geographically separated cells, thereby allowing a limited number of duplex radio channels to serve more radiotelephones than possible with prior radiotelephone communications systems having only one centrally located base station.

However, supervision of the radio channels in such cellular radiotelephone communications systems is complex and requires sophisticated control circuitry since there are large number of base stations and it is necessary to provide the capability of transferring a radiotelephone from one duplex radio channel to another when the radiotelephone moves from cell to cell. Accordingly, there exists a need for improved techniques and processes for controlling communications paths to radiotelephones in cellular radiotelephone communications systems.

OBJECTS AND SUMMARY OF THE INVENTION

Accordingly, it is an object of the present invention to provide an improved method and apparatus for quickly and efficiently assigning radio channels and scanning duplex radio channels assigned to mobile or portable radiotelephones in cellular radiotelephone communications systems.

It is another object of the present invention to provide an improved method and apparatus for assigning duplex radio channels and scanning duplex radio channels assigned to mobile or portable radiotelephones in cellular radiotelephone communications systems, that maintains the quality of communications paths to active mobile and portable radiotelephones by closely monitoring the signal strength of each active mobile and portable radiotelephone and taking corrective action when degradation of the signal strength of an active mobile or portable radiotelephone is detected.

Briefly described, the present invention encompasses both a method and apparatus for controlling radio frequency (RF) signal communications paths to remote stations, such as mobile or portable radiotelephones, of a communications system which includes a plurality of cells partitioned from a geographical area. Each cell is allocated a predetermined number of duplex RF signal channels, and includes cell control circuitry, RF signal transmitting circuitry for transmitting RF signals at a plurality of signal frequencies, and a plurality of RF signal receiving circuitry couplable to a plurality of antennas for receiving RF signals at a plurality of signal frequencies. The cell control circuitry includes apparatus for practicing the channel assigning and scanning methods of the present invention.

In the case where first and second nonadjacent cells are allocated the same first and second groups of duplex RF signal channels, a unique method performed by the cell control circuitry of the first and second cells comprises the steps of: at the first cell, assigning one of said first group of RF signal channels to a requesting remote station, and assigning one of a second group of RF signal channels to a requesting remote station when all RF signal channels of the first group have been assigned; and, at the second cell, assigning one of said second group of RF signal channels to a requesting remote station, and assigning one of said first group of RF signal channels to a requesting remote station when all are signal channels of said second group have been assigned. This inventive method minimizes cochannel interference between cells using the same frequency channels by requiring that both cells assign different frequency channels before assigning the same frequency channels. Thus, the potential for cochannel interference is minimized as long as system usage in the two cells is low.

Another unique method performed by the cell control circuitry comprises the steps of: assigning one of the RF signal channels to each requesting remote station; sampling N times the strength of the RF signal received by each antenna from each remote station assigned an RF signal channel, where N is an integer number greater than one; selecting for each remote station the antenna for which at least one of its N sampled signal strengths has a magnitude greater than the magnitude of any of the N sampled signal strengths for all other antennas; comparing the magnitude of the largest sampled signal strength of the selected antenna for each such remote station to a predetermined magnitude; and either requesting one other cell control circuitry to sample the signal strength of a remote station when the magnitude of the largest sampled signal strength of the selected antenna is less than a predetermined magnitude, or transmitting a control signal to a remote station for causing said remote station to increase or decrease the strength of its transmitted RF signal when the magnitude of the largest sampled signal strength of the selected antenna is less than a predetermined minimum magnitude or greater than a predetermined maximum magnitude, respectively. This inventive method insures that the signal strength of each active remote station is maintained at an adequate level for good quality communications.

Another unique method performed by the cell control circuitry comprises the steps of: assigning one of the RF signal channels and one of the plurality of RF signal receiving circuitry to each requesting remote station; periodically sampling N times the strength of the RF signal received by each antenna from each remote station assigned an RF signal channel, where N is an integer number greater than one; and coupling the assigned RF signal receiving circuitry for each such remote station to the antenna for which at least one of its N sampled signal strengths has a magnitude greater than the magnitude of the N sampled signal strengths for all other antennas. This inventive method insures that the RF signal receiver assigned for each remote station is always coupled to the antenna that is receiving the best signal from that remote station.

Yet another unique method performed by the cell control circuitry is comprised of the steps of; assigning one of the RF signal channels and one of the plurality of RF signal receiving means to each requesting remote station; incrementing timers for each remote station assigned an RF signal channel by a predetermined amount at successive time intervals; reassigning RF signal channels that were previously assigned to remote stations whose timer has a magnitude greater than a predetermined maximum magnitude; selecting a remote station whose transmitted RF signal is being received and whose timer has a magnitude greater than a predetermined minimum magnitude; sampling N times the strength of the RF signal received by each antenna from said selected remote station, where N is an integer number greater than one; and resetting the timer of the selected remote station to a predetermined initial magnitude. This inventive method insures that there is at least a minimum time interval between taking different sets of N sampled signal strengths for each active remote station.

DETAILED DESCRIPTION OF THE PREFERRED EMBODIMENT

Figure 1:
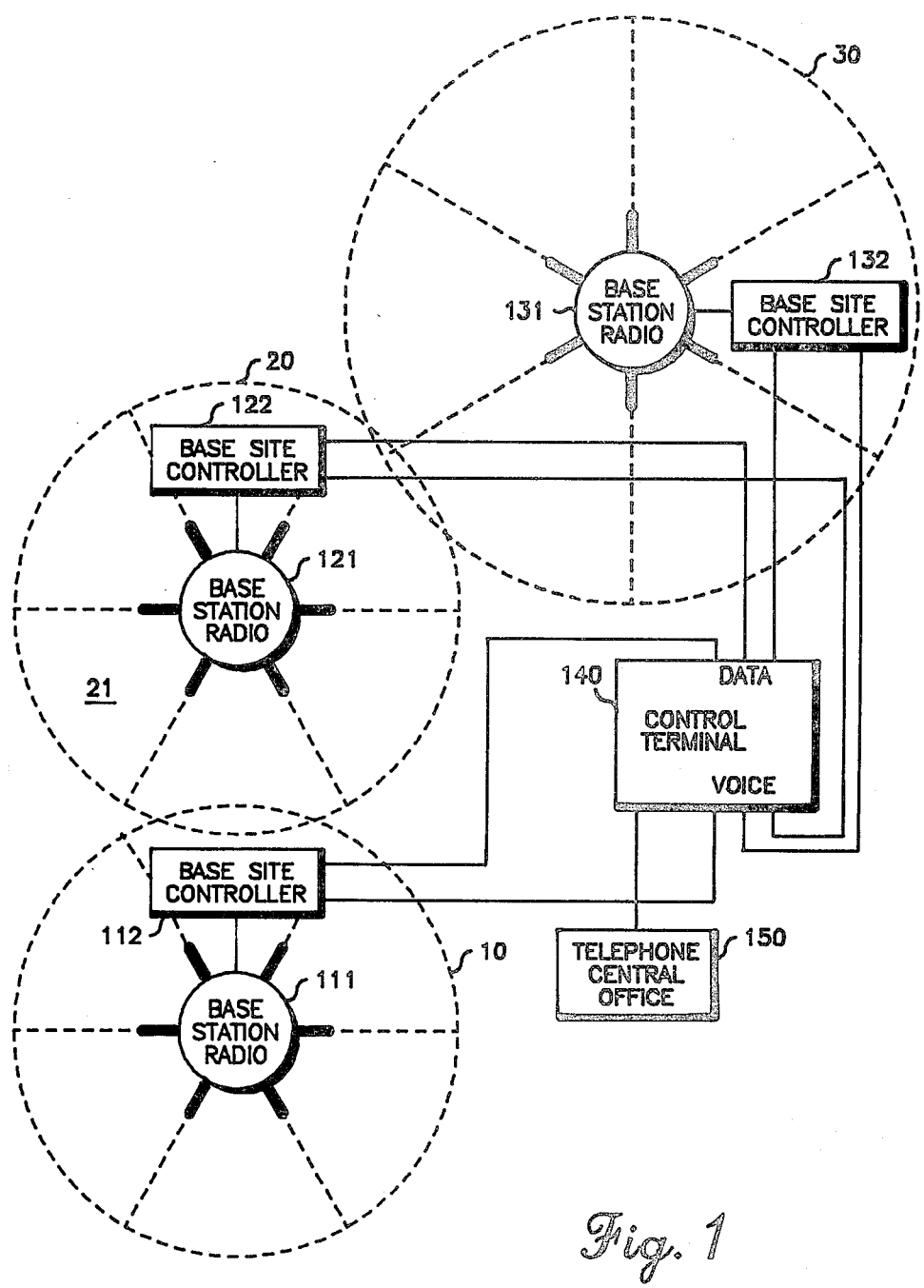
FIG. 1 is a block diagram of a radiotelephone communications system that may advantageously utilize the channel assigning and scanning method and apparatus of the present invention.

Referring to FIG. 1, there is illustrated a cellular radiotelephone communications system of the type described in U.S. Pat. Nos. 3,663,762, 3,906,166; in an experimental cellular radiotelephone system application filed under FCC Docket No. 18262 with the Federal Communications Commission by Motorola and American Radio-Telephone Service, Inc., in Feb. 1977; and more recently in a system description entitled "Motorola DYNATAC Cellular Radiotelephone Systems", published by Motorola, Inc., Schaumburg, Ill., in 1982. Such cellular systems provide telephone coverage to both mobile and portable radiotelephones located throughout a large geographical area. Portable radiotelephones may be of the type described in U.S. Pat. Nos. 3,962,553 and 3,906,166 and in U.S. patent application No. 187,304, filed Sept. 15, 1980, invented by Larry C. Puhl et al, entitled "Microprocessor Controlled Radiotelephone Transceiver" and assigned to the instant assignee; and mobile radiotelephones may be of the type described in Motorola instruction manual number 68P81039E25, published by Motorola Service Publications, Schaumburg, Ill., in 1979. The geographical area may be subdivided into cells 10, 20 and 30, which each may include a base station radio 111, 121 and 131 and an associated base site controller 112, 122 and 132. Base site controllers 112, 122 and 132 are each coupled by data and voice links to a radiotelephone control terminal 140, which may be similar to the terminals described in U.S Pat. Nos. 3,663,762, 3,764,915, 3,819,872, 3,906,166 and 4,268,722. These data and voice links may be provided by dedicated wire lines, pulse-code-modulated carrier lines, microwave radio channels, or other suitable communication links. Control terminal 140 is in turn coupled to a conventional telephone central office 150 for completing telephone calls between mobile and portable radiotelephones and landline telephones.

Each base station radio 111, 121 and 131 in FIG. 1 includes a plurality of transmitters and receivers for operating on at least one duplex signalling channel and a plurality of duplex voice channels. Base station radios 111, 121 and 131 may be of the type described in Motorola instruction manual number 68P81060E30, published by Motorola Service Publications, Motorola, Inc., Schaumburg, Ill., in 1982. Base station radios 111, 121 and 131 are located substantially at the center of each of the corresponding cells 10, 20 and 30. The base station transmitters may be combined onto one omni-directional antenna, while the base station receivers may be intercoupled to two or more directional or omni-directional sector antennas. In FIG. 1 the base station radios 111, 121 and 131 each include six 60° sector antennas. Each sector antenna primarily covers a portion of a cell, such as portion 21 of cell 20, and typically has a coverage area that overlaps the coverage area of adjacent sector antennas. Since the signalling channel requires an omni-directional receiving pattern, the signals received by the six sector antennas may be combined by a maximal ratio predetection diversity combiner, as illustrated and described in the instant assignee's co-pending U.S. patent applications, Ser. No. 22,757 (now U.S. Pat. No. 4,369,520) filed on Mar. 22, 1979, entitled "Instantaneously Acquiring Sector Anntena System" and invented by Frank J. Cerny, Jr. and James J. Mikulski, and Ser. No. 268,613, filed on June 1, 1981, entitled "Large Dynamic Range Multiplier for a Maximal-Ratio Diversity Combiner", and invented by Frank J. Cerny, Jr. and now abandoned. Furthermore, coverage of a portion of a cell may be provided by combining the signals received by two or more of the sector antennas. The sector antennas and associated receiving apparatus may be of the type described in U.S. Pat. Nos. 4,101,836 and 4,317,229.

In order to determine whether or not a mobile or portable radiotelephone leaves one cell, e.g. 20, and enters another, e.g. 10 or 30, the signal strength of the mobile or portable radiotelephone must be monitored by the base site controller 122. When the signal strength of a mobile or portable radiotelephone becomes too weak, the receiving sector antenna may be changed, or the strength of its transmitted signal may be increased by a control signal transmitted from the base site controller 122, or the mobile or portable radiotelephone can be handed off to a base site controller 112 or 132 in another cell. Hand-off involves transferring the particular mobile or portable radiotelephone from a duplex voice channel in one cell to a duplex voice channel in another cell. The signal strength for each operating mobile and portable radiotelephone can be quickly and accurately measured by utilizing the invention described in the aforementioned U.S. patent application Ser. No. 405,123 (corresponding to PCT application No. 83/01180) so that corrective action can be taken before communications are degraded or interrupted due to weak signal conditions. Furthermore, as a mobile or portable radiotelephone moves closer to a base staion radio 111, 121 or 131, the strength of the RF signal received at the base station radio from the mobile or portable radiotelephone increases and can cause interference with other communications. Accordingly, when the signal strength of a mobile or portable radio becomes too large, a base site controller can send a control signal to the particular mobile or portable radiotelephone casing it to reduce the strength of its transmitted signal. A supervisory signalling scheme and apparatus therefore that provides for such control signals is described in U.S. Pat. Nos. 3,906,166, 4,025,853, 4,029,900, 4,302,845 and 4,312,074 and the references cited therein.

Figure 2:
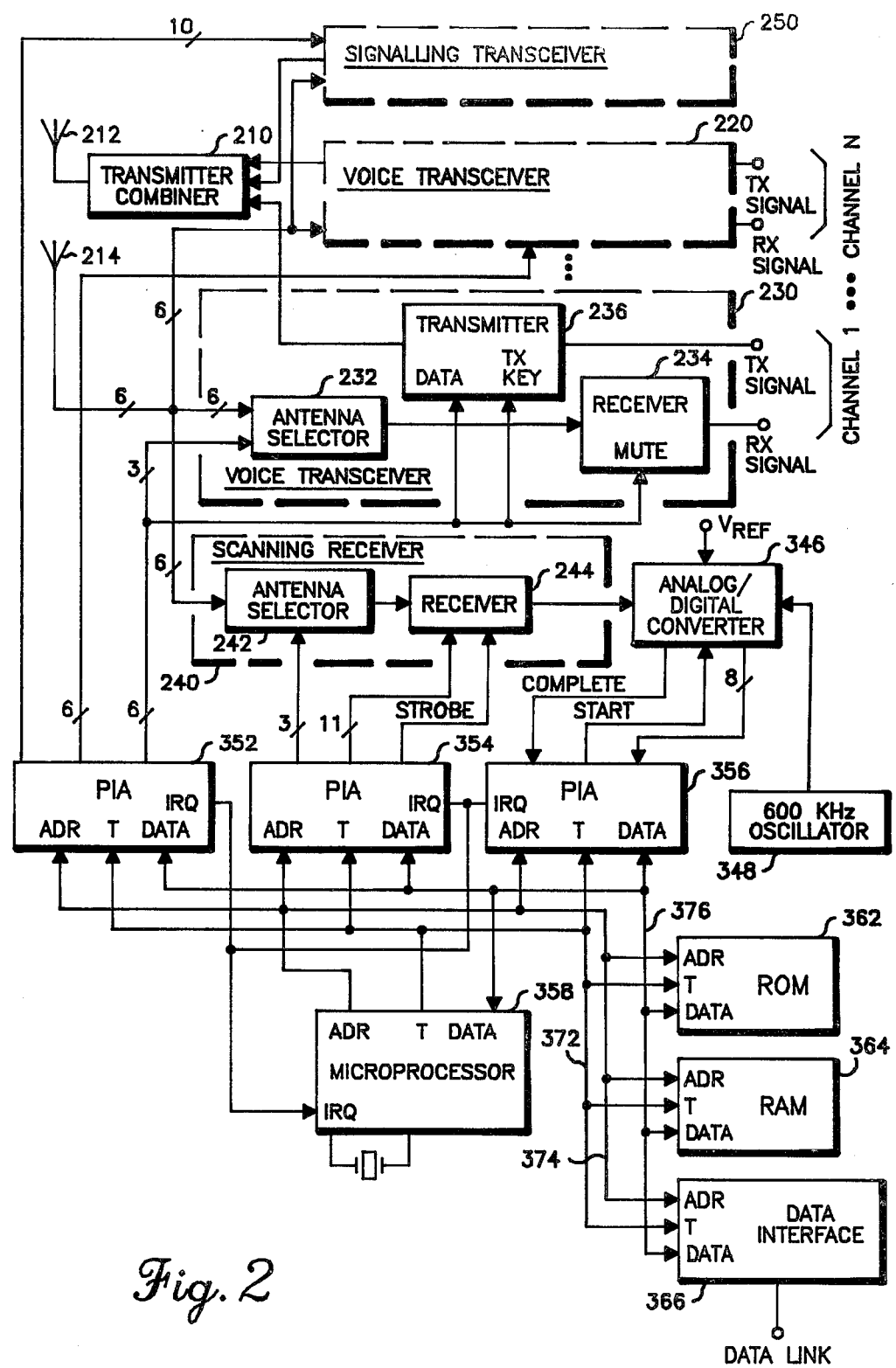
FIG. 2 is a block diagram of one of the base station radios and its associated base site controllers shown in FIG. 1.

Referring to FIG. 2, there is illustrated a block diagram of equipment suitable for use in base station radios 111, 121 and 131 and associated base site controllers 112, 122 and 132 shown in FIG. 1. The base radio equipment is identified by reference numerals between 200 and 300, and the base site controller equipment by reference numerals between 300 and 400. For example, the base station radios may include a scanning receiver 240; a signalling transceiver 250; a plurality of voice transceivers 220 and 230 each coupled to simplex transmit and receive signals from the control terminal 140 in FIG. 1; a transmitter combiner 210 for combining the transmitters of the voice transceivers and signalling transceiver, and coupling the combined signal to an omni-directional transmit antenna 212; and a plurality of sector antennas 214 coupled to the scanning receiver 240 and the receivers of the voice transceivers 220 and 230 and signalling transceiver 250. As previously explained, the transmit and receive signals may be coupled from voice transceivers 220 and 230 by means of modems and dedicated wire lines to control terminal 140 in FIG. 1. Signalling transceiver 250, voice transceivers 220 and 230, and scanning receiver 240 may be provided by the equipment described in the aforementioned Motorola instruction manual number 68P81060E30.

The operation of the signalling transceiver 250, voice transceivers 220 and 230 and scanning receiver 240 is controlled by a base site controller, which may include one or more microprocessors 358; peripheral interface adapters (PIA's) 352, 354 and 356; an analog-to-digital converter (ADC) 346 and associated oscillator 348; a read only memory (ROM) 362; a random access memory (RAM) 364; and a data interface 366 which couples microprocessor 358 by way of a modem and dedicated wire line to control terminal 140 in FIG. 1. As the number of voice channels is increased, additional microprocessors and associated interface circuitry can be added to the base site controller for sharing the supervisory workload. Sharing of the workload with multiple microprocessors may provide time savings since different microprocessors can be simultaneously working on different portions of a task.

The voice transceivers 220 and 230 in FIG. 2 each may include a transmitter 236, a receiver 234 and an antenna selector 232 for coupling one or more sector antennas 214 to receiver 234. Microprocessor 358 controls the operation of voice transceivers 220 and 230 by means of control signals provided by PIA 352. In order to select one of the six sector antennas 214, three control signals are coupled from PIA 352 to antenna selector 232. Additional control signals provided by PIA 352 key-up transmitter 236 for transmitting control signals or RF signals modulated with voice signals, and mute the output of receiver 234 when an RF signal is not being received. For example, if a supervisory audio tone is used to indicate that a desired RF signal is present, receiver 234 can be muted whenver the supervisory audio tone is not detected. The RF signal from transmitter 236 is coupled to transmitter combiner 210 where it is combined with the RF signals from other voice transceivers for application to omni-directional antenna 212. Transmitter combiner 210 may be any conventional RF signal combiner, such as, for example, the combiner described in the instant assignee's co-pending U.S. patent application No. 255,408, (now U.S. Pat. No. 4,375,622) filed on Apr. 20, 1981, entitled "Multi-Port Radio Frequency Signal Combiner", and invented by Allen H. Hollingsworth and Alan G. Deustchle. In some radiotelephone communications systems, it may be desirable to couple the RF signal from the transmitters in voice transceivers 220 and 230 to separate directional or omni-directional antennas 212, thus eliminating the need for transmitter combiner 210.

Scanning receiver 240 in FIG. 2 includes an antenna selector 242 which is coupled to the six sector antennas 214, and a receiver 240 that is coupled to the output antenna selector 242. Three control signals from PIA 354 cause antenna selector 242 to couple one of the six sector antennas 214 to receiver 244. Receiver 244 may be a conventional synthesized receiver (such as the receiver in the mobile radiotelephone described in the aforementioned Motorola Instruction Manual No. 68P81039E25), whose frequency of reception may be determined by an eleven-bit data signal applied to receiver 244 by PIA 354. An output from receiver 244, which is proportional to the strength of the RF signal being received (e.g., such as the filtered output of an envelope detector), is coupled to ADC 346, which converts the magnitude of the receiver output to an eight-bit data signal. ADC 346 is controlled by PIA 356, which applies a start signal to ADC 346 for initiating the analog-to-digital conversion process. ADC 346 is also coupled to 600 kHz oscillator 348, and completes a conversion in approximately 120 microseconds. When the analog-to-digital conversion is complete, a complete signal is applied to PIA 356 by ADC 346. ADC 346 may be any suitable conventional analog-to-digital converter, such as, for example, an ADC0803 manufactured by National Semiconductor Corporation.

The signalling transceiver 250 likewise includes a transmitter and receiver (not shown) which are tunable to any desired signalling channel in the particular radiotelephone communications system. The transmitter of signalling transceiver 250 may be coupled to transmitter combiner 210, and the receiver of signalling transceiver 250 may be coupled to a maximal ratio predetection diversity combiner of the type described in the aforementioned U.S. patent application Nos. 22,757 now U.S. Pat. No. 4,369,520 and 268,613, now abandoned, for combining the signals from sector antennas 214 to provide an omnidirectional receiving pattern. The signalling transceiver 250 provides for the transmission of digital supervisory signalling between microprocessor 358 and mobile and portable radiotelephones in its cell. Control signals are applied to, and data signals are received from, signalling transceiver 250 by means of PIA 352. Once a telephone call is in process, microprocessor 358 can transmit control signals to an active mobile or portable radiotelephone by means of the transmitters in voice transceivers 220 and 240. A suitable supervisory signaling scheme is described in the aforementioned U.S. Pat. Nos. 3,906,166, 4,025,853, 4,029,900, 4,302,845 and 4,312,074.

As explained hereinabove, the operation of the voice transceivers 220 and 230 and scanning receiver 240 is controlled by microprocessor 358. Microprocessor 358 may be any suitable conventional microprocessor, such as, for example, a Motorola type MC6800, MC6801, or MC6802 microprocessor. Microprocessor 358 may be suitably programmed to execute the flow chart in FIGS. 3, 4, 5 and 6 for assigning duplex voice channels and scanning duplex voice channels assigned to mobile or portable radiotelephones in its cell.

Figure 3A:
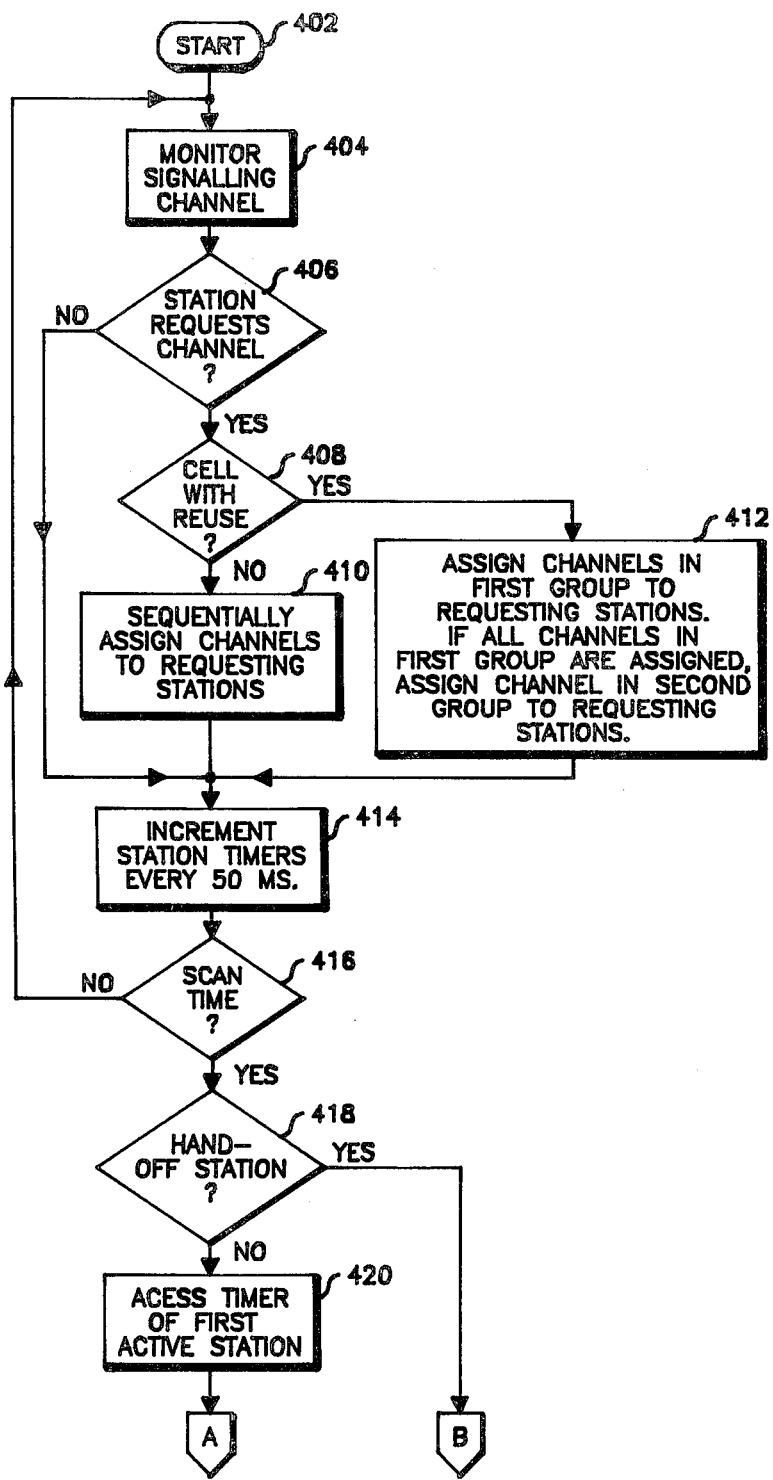
FIGS. 3A, 3B, 3C and 3D arranged as in FIG. 4 are a flow chart illustrating the channel assigning and scanning method of the present invention.
Figure 3B:
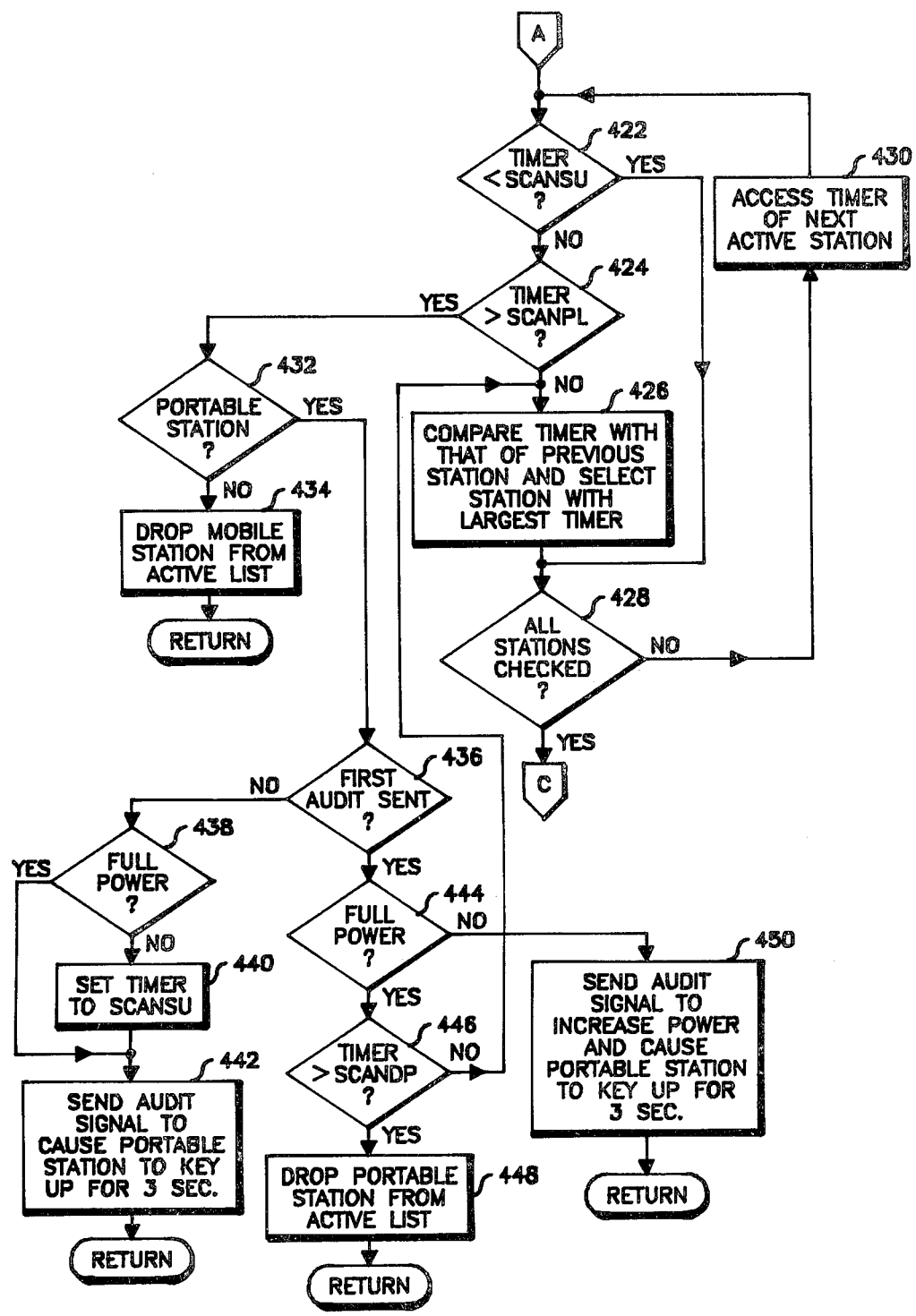
Figure 3C:
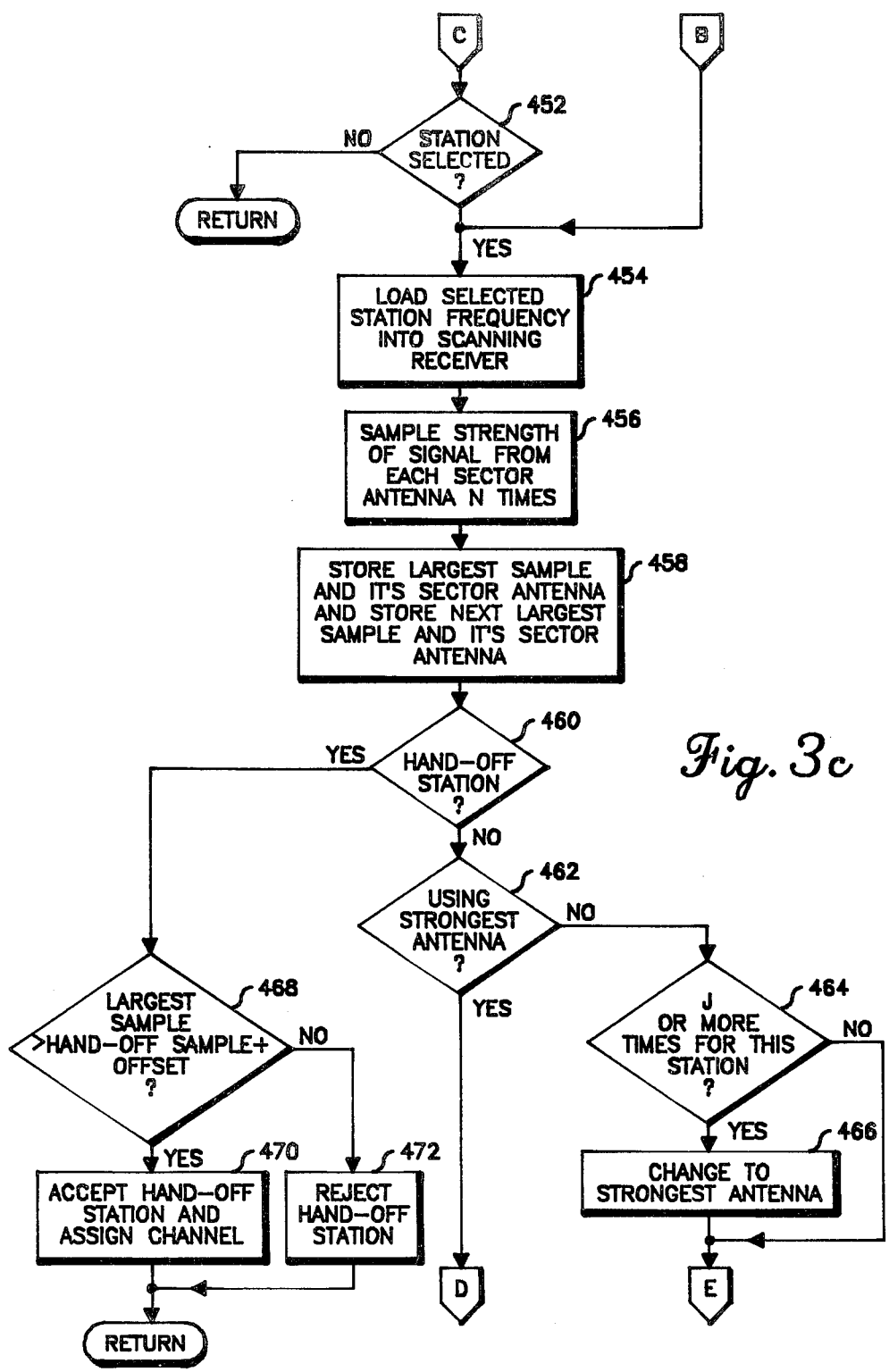
Figures 3D, 4:
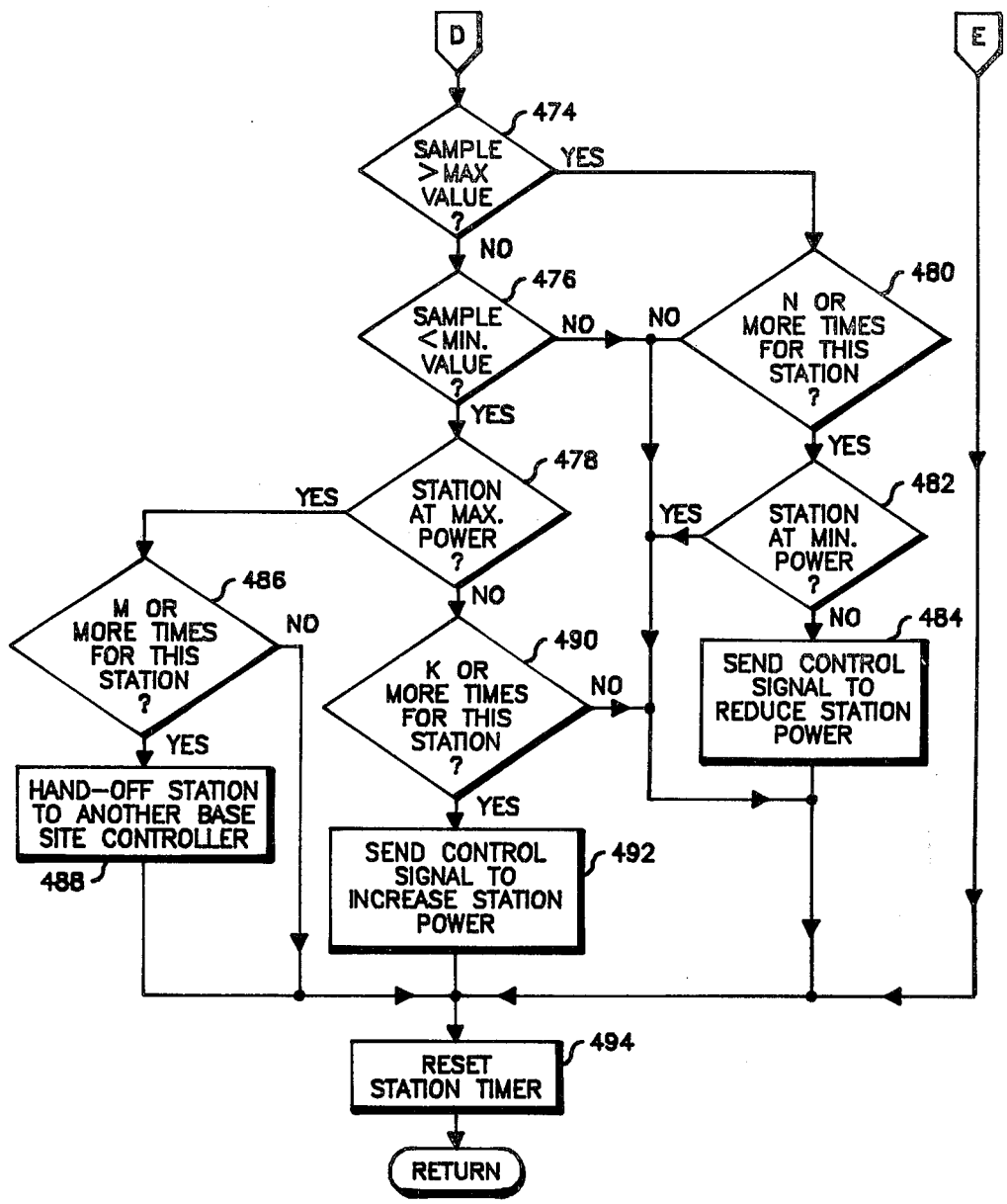

Referring to FIGS. 3A, 3B, 3C and 3D as arranged in FIG. 4, there is illustrated a flow chart embodying the channel assigning and scanning methods of the present invention. Entering the channel assigning portion of the flow chart at START block 402 in FIG. 3A, program control proceeds to block 404 where microprocessor 358 in FIG. 2 monitors the signalling channel for channel request signals from mobile or portable radiotelephone stations. If no station requests a channel, NO branch is taken from decision block 406 to block 414. Otherwise, YES branch is taken from decision block 406 to decision block 408 where it is determined whether or not this cell has frequency reuse. Cells which are sufficiently geographically separated can both utilize the same frequency radio channels. If this cell has frequency reuse, YES branch is taken to block 412 where a channel from a first group of radio channels is assigned to a requesting station. If all channels in the first group are assigned, a channel in a second group is assigned to the requesting station. For example, assuming each reuse cell has the same set of channels each having different RF signal frequencies and being assigned the same number in each reuse cell, the first group of channels in one of the reuse cells may be even numbered channels, while the first group of channels in the other reuse cell may be odd numbered channels.

Thus, cochannel interference between reuse channels will be minimized during conditions when only channels of the first group are used to accommodate telephone calls in the reuse cells, since both reuse cells are using different frequency channels. In order to make sure that all channels are periodically exercised, the even/odd channel pattern may be changed once per hour in the reuse cells. If a cell does not have reuse, NO branch is taken from decision block 408 to block 410 where channels are sequentially assigned on a round robin basis to requesting stations.

Next, at block 414 in FIG. 3A, timers associated with each active station are incremented by one every predetermined time interval, such as, for example, every fifty milliseconds. The station timers indicate how long it has been since the last time the corresponding station was scanned to determine its signal strength. Therefore, the station timers can be monitored to determine whether or not any action must be taken to avoid degradation in communications with the active stations. Next, at decision block 416, it is determined whether or not it is time to scan the active stations. The active stations must be scanned at periodic intervals to insure that each active station has adequate signal strength to provide good voice communications. The time interval between scanning active stations depends on a number of things, including the time it takes scanning receiver 240 in FIG. 2 to tune to the frequency of a selected station, the time it takes the scanning receiver to switch to another sector antenna, the number of signal strength samples taken for each sector antenna, and the time between taking each signal strength sample. Assuming that scanning each active station every fourteen seconds is adequate for a cell having a ten mile diameter, then scans would have to be performed approximately three times per second to handle a cell having thirty-two voice channels. In other words, forty-two stations, including thirty-two active stations and ten hand-off stations, could be scanned in the fourteen second time interval. On the foregoing basis, the time between scans may be selected to be approximately 350 milliseconds for each cell in most radiotelephone communications sytems. If it has not been 350 milliseconds since the last scan, NO branch is taken from decision block 416 back to block 404 to resume monitoring of the signalling channel for channel request signals. Assuming it has been 350 milliseconds or more since the last scan, YES branch is taken to block 418 where the scanning portion of the flow chart is entered.

The scanning method of the present invention quickly and efficiently takes signal strength measurements on each sector antenna for a selected station, and, on the basis of the measured signal strength, either takes no further action, or changes sector antennas, or raises or lowers the power of the signal transmitted from the selected station, or hands off the selected station to another cell so as to optimize its signal strength for good voice communications. Parameters utilized by the scanning method can be varied in each cell in order to optimize voice communications in a particular radiotelephone communications system. For example, parameters may be utilized to set the minimum and maximum allowable signal strengths for each cell or for each sector of a cell. In other words, different cells or even different sectors of a cell may have different minimum and maximum allowable signal strength parameters. Also, parameters can be varied for determining how many out-of-range signal strength readings must have been taken before changing sector antennas, or changing the power output of a station, or handing off a station to another cell. For example, according to a feature of the present invention, when the signal strength of a selected station is below the minimum allowed level, an attempt may first be made to change the sector antenna used in the receiver of the voice transceiver assigned to the selected station. If no other sector antenna is receiving a stronger signal from the selected station, or changing sector antennas did not result in a signal strength greater than the minimum allowed signal strength, then an attempt may be made to increase the power output of the selected station. The power output of the selected station can be increased in one or more steps between a minimum level and a maximum level. If the selected station is already transmitting at full power and its signal strength is still below the minimum allowed signal strength, an attempt may be made to hand off the selected station to another cell. Conversely, when the signal strength of a selected station exceeds the maximum allowable signal strength, the power output of the selected station may be reduced in one or more steps to prevent overloading of the receiver in the voice transceiver assigned to the station.

Each time the scanning portion of the flow chart in FIG. 3A is entered at block 418, one active station is processed. Hand-off stations are given priority over all other active stations since hand-off stations are most likely already outside of the cell that is presently servicing it. Therefore, at decision block 418, a check is made to determine whether a request has been received from another cell to scan a hand-off station. If so, YES branch is taken to block 454 in FIG. 3C in order to measure the signal strength of the hand-off station. The sector antenna receiving the strongest signal from the hand-off station is identified in blocks 454, 456 and 458. Next, at decision block 460, YES branch is taken to decision block 468, where the largest signal strength sample is compared to the sample received from the requesting cell. If the largest signal strength sample is greater than the requesting cell sample plus and offset, YES branch is taken to block 470, where the hand-off station is accepted and is subsequently assigned a channel. The value of the offset can vary from zero to any desired value, which may be determined by a stored parameter. If the largest signal strength sample is not greater than the requesting cell sample plus an offset, NO branch is taken from decision block 468 to block 472, where the hand-off station is rejected. A message indicating acceptance or rejection is returned via the control terminal 140 in FIG. 1 to the requesting cell. An alternative way of handling hand-off stations is to make a direct comparison between the largest signal strength sample and a threshold value, which may be determined by a stored parameter. From blocks 470 and 472, program control returns to monitoring the signalling channel.

Returning back to decision block 418 in FIG. 3A, if there are no hand-off requests, NO branch is taken to block 420 where the timer of the first active station is accessed. Next, the portion of the flow chart starting in FIG. 3B at block 422 essentially selects the station which has the largest timer indicating that the elapsed time since it was last scanned is greater than that for any other active station. Proceeding to decision block 422, the accessed timer is compared to a parameter labeled SCANSU, which is a time period during which subsequent scanning is suppressed. In the preferred embodiment of the present invention, SCANSU has been selected to be seven seconds. If the accessed timer is less than SCANSU, YES branch is taken to decision block 428, where it is determined whether or not the timers for all active stations have been accessed and checked. If not, NO branch is taken to block 430 where the timer of the next active station is accessed, and the process is repeated from decision block 422.

If the accessed timer is greater than SCANSU, NO branch is taken from decision block 422 in FIG. 3B to decision block 424, where the accessed timer is compared to a parameter labeled SCANPL. SCANPL is the maximum allowable time from the previous scan for a selected station. In the preferred embodiment of the present invention, SCANPL has been selected to be fourteen seconds. If the accessed timer is less than SCANPL, NO branch is taken to block 426, where, if the corresponding station is still active and transmitting an RF signal, its accessed timer is compared with the previously selected timer and the larger of the two is selected. When all active station timers have been accessed and checked, the station selected at block 426 is presently transmitting an RF signal and has a timer that is greater than SCANSU but less than SCANPL.

If a station timer is greater than SCANPL, YES branch is taken from decision block 424 in FIG. 3B to decision block 432, where it is determined whether or not the corresponding station is a portable or mobile radiotelephone. If the corresponding station is a mobile radiotelephone, NO branch is taken to block 434 where the mobile station is dropped from the list of active stations and its timer is reset. Since mobile stations transmit continuously when in use, the most likely reason that a mobile station timer will exceed SCANPL is that the mobile station's transmitter has become too weak to be received, or that the mobile station has dropped the call because the base station transmitter has become too weak.

If the corresponding station is a portable station, YES branch is taken from decision block 432 in FIG. 3B to decision block 436, where it is determined whether or not the portable station has been sent an audit signal. Portable stations with voice operated transmit (VOX) pose an additional problem for a radiotelephone communications system since portable stations may appear to be inactive when, in fact, the portable station user is just listening. Therefore, according to a feature of the present invention, when the timer for a portable station exceeds SCANPL, an audit signal may be sent to the portable to cause it to key up for a predetermined time interval, such as, for example, three seconds. Then, while the portable station is keyed up, its signal strength can be measured to determine if any action is necessary to maintain the quality of communications.

If a first audit signal has not been sent, NO branch is taken from decision block 436 in FIG. 3B to decision block 438, where it is determined whether or not the corresponding portable station is operating at full power. If so, YES branch is taken to block 442 where an audit signal is sent by microprocessor 358 in FIG. 2 by way of the assigned voice transceiver 220 or 240 to the corresponding portable station commanding it to key up for a three second time interval. If the portable unit was not at full power, NO branch is taken from decision block 438 to block 440 where the timer for the corresponding portable station is set to be equal to SCANSU. The portable station timer is set back SCANSU to insure that the portable station will be scanned during one of the succeeding scans. After the portable station timer is set SCANSU at block 440, an audit signal is sent to the portable station at block 442 to cause the portable station to key up for three seconds, so that the portable station transmitter will be on for approximately the next nine scans.

If a first audit signal has been sent to the corresponding portable station, YES branch is taken from decision block 436 in FIG. 3B to decision block 444, where it is determined whether or not the portable station is at full power. If the portable station is not at full power, NO branch is taken to block 450 where an audit signal is sent to the portable station causing it to increase its power output and key up for a three second time interval. The audit signal can cause a portable station to increase its power output in one or more steps until full power is reached. The size and number of the steps can be varied depending on the requirements of a particular radiotelephone communications system.

If a portable station is already at full power, YES branch is taken from decision block 444 in FIG. 3B to decision block 446, where it is determined whether or not the timer for the portable station is greater than the parameter SCANDP. SCANDP is the maximum allowable time from a previous scan for portable station timers. In the preferred embodiment of the present invention, SCANDP has been selected to be twenty-one seconds. If a portable station timer is greater than SCANDP, YES branch is taken to block 448 where that particular portable station is dropped from the list of active stations and its timer is reset. Thus, portable stations that have not been transmitting for a time interval in excess of SCANDP will be considered to be lost and their telephone call will be terminated. If a portable station timer is not greater than SCANDP, NO branch is taken from decision block 446 back to block 426, where the portable station timer is selected if it is larger than a station timer previously selected at block 426 and the portable station is presently transmitting. This point in the flow chart is reached only if the particular portable station has been audited at least once and is transmitting at full power.

If a RETURN block is reached before all station timers have been accessed and processed by blocks 422, 424, 426, 428 and 430 in FIG. 3B, program control is returned to monitoring of the signalling channel for channel requests from mobile and portable radiotelephone stations. If decision block 428 is reached and all station timers have been accessed and checked, YES branch is taken to decision block 452 in FIG. 3C, where it is determined whether or not an active, transmitting station had been selected in block 426. If a station was not selected, NO branch is taken and program control returns to monitoring the signalling channel. If a station has been selected, YES branch is taken from decision block 452 to block 454 to begin the process of measuring the signal strength of the selected station. As previously explained, block 454 may also be reached from decision block 418 in FIG. 3A if a hand-off request has been received.

Next, at block 454 in FIG. 3C, scanning receiver 240 in FIG. 2 is loaded with the frequency of the channel on which the selected station is operating. Proceeding to block 456, the signal strength of the signal received by each sector antenna is measured N times, where N is a parameter greater than one. In the preferred embodiment, N is set to thirty-two so that thirty-two signal strength samples are taken for each of the six sector antennas. Then, at block 458, microprocessor 358 in FIG. 2 stores the largest signal strength sample taken in block 456 and its corresponding sector antenna number, and, for the remaining sector antennas, stores the next largest signal strength sample and its corresponding sector antenna number. Next, at decision block 460, it is determined whether or not the station being processed is a hand-off station. If so, YES branch is taken to block 468, where it is determined whether or not to accept the hand-off station. If the station is not a hand-off station, NO branch is taken from decision block 460 to decision block 462, where it is determined whether or not the voice transceiver assigned to the selected station is using the sector antenna receiving the strongest signal. In other words, if the sector antenna presently being used by the voice transceiver 220 or 230 in FIG. 2 assigned to the selected mobile station is not receiving the strongest signal, the selected antenna coupled to the voice transceiver may be changed to improve the quality of voice communications. If the transceiver assigned to the selected station is not using the sector antenna having the largest signal strength sample, NO branch is taken to decision block 464, where it is determined if this condition has occurred J or more times, where J is a parameter greater than one. If so, YES branch is taken to block 466 where the voice transceiver assigned to the selected station is switched to the sector antenna having the largest signal strength sample. By requiring that this condition occurs J or more times, excessive switching between sector antennas is avoided. Program control proceeds from NO branch of decision block 464 and from block 466 to block 494 in FIG. 3D, where the timer of the selected station is reset to zero. The selected station timer is reset at block 494 so that the particular station will not be scanned again until after a time interval of length SCANSU. If scans could occur too frequently, both unnecessary overhead would be created and successive signal strength readings may be too highly correlated. Therefore, the scan frequency should be high enough to ensure that any station passing through the transition region between cells at top speed would be scanned at least the M times required for hand off in block 486 in FIG. 3D. Thus, according to an important feature of the present invention, excessive scanning is prevented through the use of the delay parameter, SCANSU, which establishes the minimum amount of time which must elapse before a station is eligible to be scanned again.

If the selected station is already using the sector antenna having the largest signal strength sample, YES branch is taken from decision block 462 in FIG. 3C to decision block 474 in FIG. 3D, where it is determined whether the largest signal strength sample is greater than the maximum allowable signal strength. If so, YES branch is taken to decision block 480 where it is determined whether or not this condition has occurred N or more times, where N is a parameter greater than one. If so, YES branch is taken to decision block 482, where it is determined whether or not the selected station is already at minimum power output. If not, NO branch is taken to block 484 where a control signal is sent by microprocessor 358 in FIG. 2 to the selected station commanding it to reduce its power output. The power output reduction can be taken in one or more steps until the minimum power output is reached. Program control proceeds from NO branch of decision block 480, YES branch of decision block 482 and from block 484 to block 494, where the timer of the selected station is reset to zero.

If the largest signal strength sample is not greater than the maximum allowable signal strength, NO branch is taken from decision block 474 in FIG. 3D to decision block 476, where the largest signal strength sample is compared to the minimum allowable signal strength. If the signal strength sample is greater than or equal to the minimum allowable signal strength, NO branch is taken to block 494 where the selected station timer is reset. Otherwise, YES branch is taken from decision block 476 to decision block 478, where it is determined whether or not the selected station is transmitting at maximum power output. If the selected station is already transmitting at maximum power output, YES branch is taken to decision block 486, where it is determined whether or not this condition has occurred M or more times, where M is a parameter greater than one. If so, YES branch is taken to block 488 where a hand-off request is sent via control terminal 140 in FIG. 1 to other adjacent base site controllers. As explained hereinabove, the other adjacent base site controllers scan the hand-off station to determine if it will accept the hand-off station. Program control proceeds from NO branch of decision block 486 and from block 488 to block 494 where the selected station timer is reset.

If the selected station is not already transmitting at maximum power output, NO branch is taken from decision block 478 in FIG. 3D to decision block 490, where it is determined whether or not this condition has occurred K or more times, where K is a parameter greater than one. If so, YES branch is taken to block 492 where microprocessor 358 in FIG. 2 sends a control signal to the selected station commanding it to increase its power output. The power output can be increased in one or more steps until the maximum power output is reached. Program control proceeds from NO branch of decision block 490 and from block 492 to block 494 where the selected station timer is reset. Thereafter, program control returns to scanning the signalling channel.

The flow chart in FIGS. 3A, 3B, 3C and 3D as arranged in FIG. 4, provide a detailed description of the process steps necessary for implementing the channel assigning and scanning method of the present invention in programmable control circuitry, such as microprocessor 358 and its associated circuitry in FIG. 2. By way of analogy to an electrical circuit diagram, the detailed flow chart in FIGS. 3A, 3B, 3C and 3D is equivalent to a detailed schematic for an electrical circuit, where provision of the exact part values for the electrical components in the electrical circuit corresponds to provision of microprocessor instructions for blocks in the flow chart. Therefore, coding the process steps in the blocks of the detailed flow chart in FIGS. 3A, 3B, 3C and 3D into the appropriate instructions of a suitable conventional microprocessor is a mere mechanical step for one skilled in the art. If the Motorola MC6800 series of microprocessors is utilized for microprocessor 358 in FIG. 2, programming techniques for the Motorola MC6800 series microprocesors are described in many currently available sources, including "Basic Microprocessors And The 6800" by Ron Bishop, published by the Hayden Book Company, Inc. in 1979; "Programming The 6800 Microprocessor" by Bob Southern, published by Motorola Semiconductor Products, Inc., Literature Distribution Center, Phoenix, Ariz. in 1977; and the "MC6801 8-Bit Signal-Chip Microcomputer Reference Manual", published by Microprocessor Operations, Motorola Inc., Austin, Tex., in 1980.

In summary, a unique method and apparatus for efficiently assigning duplex radio channels and scanning duplex radio channels assigned to mobile and portable radiotelephones in a cellular communications system have been described. The unique channel assigning and scanning method and apparatus therefor maintain high quality communications paths to mobile and portable radiotelephones by periodically monitoring their signal strength and either changing base station sector antennas coupled to voice transceivers, increasing or decreasing radiotelephone power output, or handing radiotelephones off to another cell when signal strength degradations are detected. In order to avoid unnecessary switching between sector antennas and power output levels, variable parameters are used to determine the number of degraded signal strength readings that must occur before corrective action is taken. The channel assigning and scanning methods of the present invention can be advantageously utilized in any communications system having a plurality of base stations each of which controls a number of communications paths to mobile or portable radios.

We claim:

1. A method of controlling radio frequency (RF) signal communications paths to remote stations of a communications system, said communications system including a plurality of cells partitioned from a geographical area; each cell allocated a predetermined number of duplex RF signal channels, and each cell including cell control means, RF signal transmitting means for transmitting RF signals at a plurality of signal frequencies, and RF signal receiving means coupled to a plurality of antenna means for receiving RF signals at a plurality of signal frequencies; said method performed by each of said cell control means comprising the steps of:

(a) assigning one of the RF signal channels to each requesting remote station;

(b) sampling N times the strength of the RF signal received by each antenna means from each remote station assigned an RF signal channel, where N is an integer number greater than one;

(c) selecting for each such remote station the antenna means for which at least one of its N sampled signal strengths has a magnitude greater than the magnitude of any of the N sampled signal strengths for all other antenna means;

(d) comparing the magnitude of the largest sampled signal strength of the selected antenna means for each such remote station to a predetermined magnitude; and (e) requesting at least one other cell control means to sample the signal strength of a remote station when the magnitude of the largest sampled signal strength of the selected antenna means for said remote station is less than the predetermined magnitude.

2. The method according to claim 1, further including the step of periodically repeating said steps (b), (c), (d) and (e).

3. The method according to claim 1, wherein said step (b) includes the step of selecting for each antenna means the sampled signal strength having the largest magnitude, said step (c) selecting for each such remote station the antenna means for which the selected sampled signal strength has a magnitude greater than the selected sampled signal strength for all other antenna means.

4. The method according to claim 1, further including the steps of:
   (f) at a first cell control means, transmitting the magnitude of the largest sampled signal strength received from a remote station by the selected antenna means to at least one other cell control means;
   (g) at said one other cell control means, sampling M times the strength of the RF signal received by each antenna means from said remote station, where M is an integer number greater than one;
   (h) at said one other cell control means, selecting for said remote station the antenna means for which one of its M sampled signal strengths has a magnitude greater than the magnitude of any of the M sampled signal strengths for all other antenna means;
   (i) at said one other cell control means, comparing the magnitude of the largest sampled signal strength of the selected antenna means for said remote station to the magnitude of the largest sampled signal strength transmitted from said first cell control means; and
   (j) at said one other cell control means, assigning said remote station an RF signal channel if the largest sampled signal strength of the selected antenna means for said remote station is at least a predetermined amount greater than the largest sampled signal strength transmitted from said first cell control means.

5. The method according to claim 4, wherein said step (b) includes the step of selecting for each antenna means the sampled signal strength having the largest magnitude, said step (c) selecting for each such remote station the antenna means for which the selected sampled signal strength has a magnitude greater than the selected sampled signal strength for all other antenna means.

6. The method according to claim 4 or 5, wherein said step (g) includes the step of selecting for each antenna means the sampled signal strength having the largest magnitude, said step (h) selecting for said remote station the antenna means for which the selected sampled signal strength has a magnitude greater than the selected sampled signal strength for all other antenna means.

7. The method according to claim 4, wherein said step (i) further includes the step of adding a predetermined number to the sampled signal strength transmitted from said first cell control means, said step (i) comparing the magnitude of the largest sampled signal strength of the selected antenna means to the magnitude of the sum of the predetermined number and the largest sampled signal strength transmitted from said first cell control means.

8. The method according to claim 1, further including the steps of:
   (f) at a first cell control means, transmitting the magnitude of the largest sampled signal strength received from a remote station by the selected antenna means to at least one other cell control means;
   (g) at said one other cell control means, sampling M times the strength of the RF signal received by eacn antenna means from said remote station, where M is an integer number greater than one;
   (h) at said one other cell control means, selecting for said remote station the antenna means for which one of its M sampled signal strengths has a magnitude greater than the magnitude of any of the M sampled signal strengths for all other antenna means;
   (i) at said one other cell control means, comparing the magnitude of the largest sampled signal strength of the selected antenna means for said remote station to a predetermined magnitude; and
   (j) at said one other cell control means, assigning said remote station an RF signal channel if the magnitude of the largest sampled signal strength of the selected antenna means for said remote station is at least a predetermined amount greater than the predetermined magnitude.

9. The method according to claim 1, wherein said step (c) further includes the step of selecting for each such remote station a second antenna means for which at least one of its N sampled signal strengths has a magnitude greater than the magnitude of any of the N sampled signal strengths for the remaining ones of said other antenna means.

10. A method of controlling radio frequency (RF) signal communications paths to remote stations of a communications system, said communications system including a plurality of cells partitioned from a geographical area; each cell allocated a predetermined number of duplex RF signal channels, and each cell including cell control means, RF signal transmitting means for transmitting RF signals at a plurality of signal frequencies, and RF signal receiving means coupled to a plurality of antenna means for receiving RF signals at a plurality of signal frequencies; said method performed by each of said cell control means comprising the steps of:
   (a) assigning one of the RF signal channels to each requesting remote station;
   (b) sampling N times the strength of the RF signal received by each antenna means from each remote station assigned an RF signal channel, where N is an integer number greater than one;
   (c) selecting for each such remote station the antenna means for which at least one of its N sampled signal strengths has a magnitude greater than the magnitude of any of the N sampled signal strengths for all other antenna means;
   (d) comparing the magnitude of the largest sampled signal strength of the selected antenna means for each such remote station to a predetermined magnitude; and
   (e) transmitting a control signal to a remote station for causing said remote station to increase the strength of its transmitted RF signal when the magnitude of the largest sampled signal strength of the selected antenna means for said remote station is less than the predetermined magnitude.

11. The method according to claim 10, further including the step of periodically repeating said steps (b), (c), (d) and (e).

12. The method according to claim 10, wherein said step (b) includes the step of selecting for each antenna means the sampled signal strength having the largest magnitude, said step (c) selecting for each remote station the antenna means for which the selected sampled signal strength has a magnitude greater than the selected sampled signal strength for all other antenna means.

13. The method according to claim 10, wherein said step (c) further includes the step of selecting for each such remote station a second antenna means for which at least one of its N sampled signal strengths has a magnitude greater than the magnitude of any of the N sampled signal strengths for the remaining ones of said other antenna means.

14. A method of controlling radio frequency (RF) signal communications paths to remote stations of a communications system, said communications system including a plurality of cells partitioned from a geographical area; each cell allocated a predetermined number of duplex RF signal channels, and each cell including cell control means, RF signal transmitting means for transmitting RF signals at a plurality of signal frequencies, and RF signal receiving means coupled to a plurality of antenna means for receiving RF signals at a plurality of signal frequencies; said method performed by each of said cell control means comprising the steps of:
 (a) assigning one of the RF signal channels to each requesting remote station;
 (b) sampling N times the strength of the RF signal received by each antenna means from each remote station assigned an RF signal channel, where N is an integer number greater than one;
 (c) selecting for each such remote station the antenna means for which at least one of its N sampled signal strengths has a magnitude greater than the magnitude of any of the N sampled signal strengths for all other antenna means;
 (d) comparing the magnitude of the largest sampled signal strength of the selected antenna means for each such remote station to a predetermined magnitude; and
 (e) transmitting a control signal to a remote station for causing said remote station to decrease the strength of its transmitted RF signal when the magnitude of the largest sampled signal strength of the selected antenna means for said remote station is greater than the predetermined magnitude.

15. The method according to claim 14, further including the step of periodically repeating said steps (b), (c), (d) and (e).

16. The method according to claim 14, wherein said step (b) includes the step of selecting for each antenna means the sampled signal strength having the largest magnitude, said step (c) selecting for each such remote station the antenna means for which the selected sampled signal strength has a magnitude greater than the selected sampled signal strength for all other antenna means.

17. The method according to claim 14, wherein said step (c) further includes the step of selecting for each such remote station a second antenna means for which at least one of its N sampled signal strengths has a magnitude greater than the magnitude of any of the N sampled signal strengths for the remaining ones of said other antenna means.

18. A method of controlling radio frequency (RF) signal communications paths to remote stations of a communications system, said communications system including a plurality of cells partitioned from a geographical area; each cell allocated first and second groups of duplex RF signal channels, and each cell including cell control means, RF signal transmitting means for transmitting RF signals at a plurality of signal frequencies, and RF signal receiving means coupled to a plurality of antenna means for receiving RF signals at a plurality of signal frequencies; and at least first and second non-adjacent cells being allocated the same first and second groups of duplex RF signal channels; said method performed by said cell control means of said first and second cells comprising the steps of:
 (a) at said first cell, assigning one of said first group of RF signal channels to a requesting remote station, and assigning one of said second group of RF signal channels to a requesting remote station when all RF signal channels of said first group have been assigned; and
 (b) at said second cell, assigning one of said second group of RF signal channels to a requesting remote station, and assigning one of said first group of RF signal channels to a requesting remote station when all RF signal channels of said second group have been assigned.

19. The method according to claim 18, further including the steps of:
 (c) at said first cell, re-assigning channels of said first group as they become available before assigning or re-assigning channels of said second group; and
 (d) at said second cell, reassigning channels of said second group as they become available before assigning or reassigning channels of said first group.

20. Control means for a base station of a radio frequency (RF) signal communications system providing communications to remote stations, said communications system including a plurality of cells partitioned from a geographical area; each cell allocated a predetermined number of duplex RF signal channels, and each cell including cell control means and a base station, each base station including RF signal transmitting means for transmitting RF signals at a plurality of signal frequencies and RF signal receiving means coupled to a plurality of antenna means for receiving RF signals at a plurality of signal frequencies; said cell control means comprising:
 means for assigning one of the RF signal channels to each requesting remote station;
 means for sampling N times the strength of the RF signal received by each antenna means from each remote station assigned an RF signal channel, where N is an integer number greater than one;
 means for selecting for each such remote station the antenna means for which at least one of its N sampled signal strengths has a magnitude greater than the magnitude of any of the N sampled signal strengths for all other antenna means;
 means for comparing the magnitude of the largest sampled signal strength of the selected antenna means for each such remote station to a predetermined magnitude; and
 means for requesting at least one other cell control means to sample the signal strength of a remote station when the magnitude of the largest sampled signal strength of the selected antenna means is less than the predetermined magnitude.

21. The cell control means according to claim 20, wherein said sampling means includes means for converting analog samples to digital samples.

22. The cell control means according to claim 20, wherein said sampling means includes means for selecting for each antenna means the sampled signal strength having the largest magnitude, said selecting means selecting for each such remote station the antenna means for which the selected sampled signal strength has a magnitude greater than the selected sampled signal strength for all other antenna means.

23. The cell control means according to claim 20, further including means for communicating sampled signal strengths between a first cell control means and a second cell control means, and further comprising:

at said first cell control means, means for transmitting the magnitude of the largest sampled signal strength received from a remote station by the selected antenna means to said second cell control means;

at said second cell control means, means for sampling M times the strength of the RF signal received by each antenna means from said remote station, where M is an integer number greater than one;

at said second cell control means, means for selecting for said remote station the antenna means for which one of its M sampled signal strengths has a magnitude greater than the magnitude of any of the M sampled signal strengths for all other antenna means;

at said second cell control means, means for comparing the magnitude of the largest sampled siqnal strength of the selected antenna means for said remote station to the magnitude of the largest sampled signal strength transmitted from said first cell control means; and at said second cell control means, means for assigning said remote station an RF signal channel if the largest sampled signal strength of the selected antenna means for said remote station is at least a predetermined amount greater than the largest sampled signal strength transmitted from said first cell control means.

24. The cell control means according to claim 23, wherein said sampling means of said first cell control means includes means for selecting for each antenna means the sampled signal strength having the largest magnitude, said selecting means of said first cell control means selecting for each such remote station the antenna means for which the selected sampled signal strength has a magnitude greater than the selected sampled signal strength for all other antenna means.

25. The cell control means according to claim 23 or 24, wherein said sampling means of said second cell control means includes means for selecting for each antenna means the sampled signal strength having the largest magnitude, said selecting means of said second cell control means selecting for said remote station the antenna means for which the selected sampled signal strength has a magnitude greater than the selected sampled signal strength for all other antenna means.

26. The cell control means according to claim 23, wherein said comparing means of said second cell control means further includes means for adding a predetermined number to the sampled signal strength transmitted from said first cell control means, said comparing means of said second cell control means comparing the magnitude of the largest sampled signal strength of the selected antenna means to the magnitude of the sum of the predetermined number and the largest sampled signal strength transmitted from said first cell control means.

27. The cell control means according to claim 20, further including means for communicating sampled signal strengths between a first cell control means and a second cell control means, and further comprising:

at said first cell control means, means for transmitting the magnitude of the largest sampled signal strength received from a remote station by the selected antenna means to said second cell control means;

at said second cell control means, means for sampling M times the strength of the RF signal received by each antenna means from said remote station, where M is an integer number greater than one;

at said second cell control means, means for selecting for said remote station the antenna means for which one of its M sampled signal strengths has a magnitude greater than the magnitude of any of the M sampled signal strengths for all other antenna means;

at said second cell control means, means for comparing the magnitude of the largest sampled signal strength of the selected antenna means for said remote station to a predetermined magnitude; and at said second cell control means, means for assigning said remote station an RF signal channel if the magnitude of the largest sampled signal strength of the selected antenna means for said remote station is at least a predetermined amount greater than the predetermined magnitude.

28. The cell control means according to claim 20, wherein said selecting means further includes means for selecting for each such remote station a second antenna means for which at least one of its N sampled signal strengths has a magnitude greater than the magnitude of any of the N sampled signal strengths for the remaining ones of said other antenna means, and means for combining the RF signals received by said selected first and second antenna means to provide a composite signal.

29. Control means for a base station of a radio frequency (RF) signal communications system providing communications to remote stations, said communications system including a plurality of cells partitioned from a geographical area; each cell allocated a predetermined number of duplex RF signal channels, and each cell including cell control means and a base station, each base station including RF signal transmitting means for transmitting RF signals at a plurality of signal frequencies and RF signal receiving means coupled to a plurality of antenna means for receiving RF signals at a plurality of signal frequencies; said cell control means comprising:

means for assigning one of the RF signal channels to each requesting remote station;

means for sampling N times the strength of the RF signal received by each antenna means from each remote station assigned an RF signal channel, where N is an integer number greater than one;

means for selecting for each such remote station the antenna means for which at least one of its N sampled signal strengths has a magnitude greater than the magnitude of any of the N sampled signal strengths for all other antenna means;

means for comparing the magnitude of the largest sampled signal strength of the selected antenna means for each such remote station to a predetermined magnitude; and means for transmitting a control signal to a remote station for causing said remote station to increase the strength of its transmitted RF signal when the magnitude of the largest sampled signal strength of the selected antenna means for said remote station is less than the predetermined magnitude.

30. The cell control means according to claim 29, wherein said sampling means includes means for converting analog samples to digital samples.

31. The cell control means according to claim 29, wherein said sampling means includes means for selecting for each antenna means the sampled signal strength having the largest magnitude, said selecting means selecting for each remote station the antenna means for which the selected sampled signal strength has a magnitude greater than the selected sampled signal strength for all other antenna means.

32. The cell control means according to claim 29, wherein said selecting means further includes means for selecting for each such remote station a second antenna means for which at least one of its N sampled signal strengths has a magnitude greater than the magnitude of any of the N sampled signal strengths for the remaining ones of said other antenna means, and means for combining the RF signals received by said selected first and second antenna means to provide a composite signal.

33. Control means for a base station of a radio frequency (RF) signal communications system providing communications to remote stations, said communications system including a plurality of cells partitioned from a geographical area; each cell allocated a predetermined number of duplex RF signal channels, and each cell including cell control means and a base station, each base station including RF signal transmitting means for transmitting RF signals at a plurality of signal frequencies and RF signal receiving means coupled to a plurality of antenna means for receiving RF signals at a plurality of signal frequencies; said cell control means comprising:
  means for assigning one of the RF signal channels to each requesting remote station;
  means for sampling N times the strength of the RF signal received by each antenna means from each remote station assigned an RF signal channel, where N is an integer number greater than one;
  means for selecting for each such remote station the antenna means for which at least one of its N sampled signal strengths has a magnitude greater than the magnitude of any of the N sampled signal strengths for all other antenna means;
  means for comparing the magnitude of the largest sampled signal strength of the selected antenna means for each such remote station to a predetermined magnitude; and
  means for transmitting a control signal to a remote station for causing said remote station to decrease the strength of its transmitted RF signal when the magnitude of the largest sampled signal strength of the selected antenna means for said remote station is greater than the predetermined magnitude.

34. The cell control means according to claim 33, wherein said sampling means includes means for converting analog samples to digital samples.

35. The cell control means according to claim 33, wherein said sampling means includes means for selecting for each antenna means the sampled signal strength having the largest magnitude, said selecting means selecting for each such remote station the antenna means for which the selected sampled signal strength has a magnitude greater than the selected sampled signal strength for all other antenna means.

36. The cell control means according to claim 33, wherein said selecting means further includes means for selecting for each such remote station a second antenna means for which at least one of its N sampled signal strengths has a magnitude greater than the magnitude of any of the N sampled signal strengths for the remaining ones of said other antenna means, and means for combining the RF signals received by said selected first and second antenna means to provide a composite signal.

37. Control means for a base station of a radio frequency (RF) signal communications system providing communications to remote stations, said communications system including a plurality of cells partitioned from a geographical area; each cell allocated first and second groups of duplex RF signal channels, each cell further including cell control means and a base station, each base station including RF signal transmitting means for transmitting RF signals at a plurality of signal frequencies and RF signal receiving means coupled to a plurality of antenna means for receiving RF signals at a plurality of signal frequencies, and at least first and second non-adjacent cells being allocated the same first and second groups of duplex RF signal channels; said first and second cell control means of said first and second cells, respectively, comprising:
  said first cell control means including means for assigning one of said first group of RF signal channels to a requesting remote station, and means for assigning one of said second group of RF signal channels to a requesting remote station when all RF signal channels of said first group have been assigned; and
  said second cell control means including means for assigning one of said second group of RF signal channels to a requesting remote station, and means for assigning one of said first group of RF signal channels to a requesting remote station when all RF signal channels of said second group have been assigned.

38. The first and second cell control means according to claim 37, wherein:
  said first cell control means further includes means for reassigning channels of said first group as they ecome available before assigning or reassigning cnannels of said second group; and
  said second cell control means further includes means for reassigning channels of said second group as they become available before assigning or reassigning channels of said first group.

39. A method of controlling radio frequency (RF) signal communications paths to remote stations of a communications system, said communications system including a plurality of cells partitioned from a geographical area; each cell allocated a predetermined number of duplex RF signal channels, and each cell including cell control means, RF signal transmitting means for transmitting RF signals at a plurality of signal frequencies, and a plurality of RF signal receiving means each couplable to a plurality of antenna means for receiving RF signals at a plurality of signal frequencies; said method performed by each of said cell control means comprising the steps of:
  (a) assigning one of the RF signal channels and one of the plurality of RF signal receiving means to each requesting remote station;
  (b) periodically sampling N times the strength of the RF signal received by each antenna means from each remote station assigned an RF signal channel, where N is an integer number greater than one; and
  (c) coupling the assigned RF signal receiving means for each such remote station to the antenna means for which at least one of its N sampled signal strengths has a magnitude greater than the magnitude of any of the N sampled signal strengths for all other antenna means.

40. The method according to claim 39, further including the steps of:
(d) comparing for each such remote station the magnitude of the largest sampled signal strength of the coupled antenna means to a predetermined magnitude for each repeated step (b); and
(e) transmitting a control signal to a remote station for causing said remote station to increase the strength of its transmitted RF signal when the largest sampled signal strength of the coupled antenna means for said remote station is less than the predetermined magnitude for at least two repeated steps (b).

41. The method according to claim 39, further including the steps of:
(d) comparing for each such remote station the magnitude of the largest sampled signal strength of the coupled antenna means to a predetermined magnitude for each repeated step (b); and
(e) requesting at least one other cell control means to sample the signal strength of a remote station when the largest sampled signal strength of the coupled antenna means for said remote station is less than the predetmined magnitude for at least two repeated steps (b).

42. The method according to claim 39, further including the steps of:
(d) comparing for each such remote station the magnitude of the largest sampled signal strength of the coupled antenna means to a predetermined magnitude for each repeated step (b); and
(e) transmitting a control signal to a remote station for causing said remote staton to decrease the strength of its transmitted RF signal when the largest sampled signal strength of the coupled antenna means for said remote station is greater than the predetermined magnitude for at least two repeated steps (b).

43. Control means for a base station of a radio frequency (RF) signal communications system providing communications to remote stations, said communications system including a plurality of cells partitioned from a geographical area; each cell allocated a predetermined number of duplex RF signal channels, and each cell including cell control means and a base station, each base station including RF signal transmitting means for transmitting RF signals at a plurality of signal frequencies and a plurality of RF signal receiving means each couplable to a plurality of antenna means for receiving RF signals at a plurality of signal frequencies; said cell control means comprising:
means for assigning one of the RF signal channels and one of the plurality of RF signal receiving means to each requesting remote station;
means for periodically sampling N times the strength of the RF signal received by each antenna means from each remote station assigned an RF signal channel, where N is an integer number greater than one; and
means for coupling the assigned RF signal receiving means for each such remote station to the antenna means for which at least one of its N sampled signal strengths has a magnitude greater than the magnitude of any of the N sampled signal strengths for all other antenna means.

44. The cell control means according to claim 43, wherein said sampling means includes means for converting analog samples to digital samples.

45. The cell control means according to claim 43, wherein said sampling means includes means for selecting for each antenna means the sampled signal strength having the largest magnitude, said coupling means coupling the assigned RF signal receiving means for each such remote station to the antenna means for which the selected sampled signal strength has a magnitude greater than the selected sampled signal strength for all other antenna means.

46. The cell control means according to claim 43, wherein said coupling means further includes means for coupling the assigned RF signal receiving means for each such remote station to a second antenna means for which at least one of its N sampled signal strengths has a magnitude greater than the magnitude of any of the N sampled signal strengths for the remaining ones of said other antenna means.

47. The control means according to claim 43, further including:
means for comparing for each such remote station the magnitude of the largest sampled signal strength of the coupled antenna means to a predetermined magnitude; and
means for transmitting a control signal to a remote station for causing said remote station to increase the strength of its transmitted RF signal when the magnitude of the largest sampled signal strength of the coupled antenna means for said remote station is less than the predetermined magnitude for at least two different sets of N sampled signal strengths.

48. The control means according to claim 43, further including:
means for comparing for each such remote station the magnitude of the largest sampled signal strength of the coupled antenna means to a predetermined magnitude; and
means for transmitting a control signal to a remote station for causing said remote staton to decrease the strength of its transmitted RF signal when the magnitude of the largest sampled signal strength of the coupled antenna means for said remote station is greater than the predetermined magnitude for at least two different sets of N sampled signal strengths.

49. The control means according to claim 43, further including:
means for comparing for each such remote station the magnitude of the largest sampled signal strength of the coupled antenna means to a predetermined magnitude; and
means for requesting at least one other cell control means to sample the signal strength of a remote station when the magnitude of the largest sampled signal strength of the coupled antenna means for said remote station is less than the predetmined magnitude for at least two different sets of N sampled signal strengths.

50. The cell control means according to claim 43, further including means for communicating sampled signal strengths between a first cell control means and a second cell control means, and further comprising:

at said first cell control means, means for transmitting the magnitude of the largest sampled signal strength received from a remote station by the selected antenna means to said second cell control means;

at said second cell control means, means for sampling M times the strength of the RF signal received by each antenna means from said remote station, where M is an integer number greater than one;

at said second cell control means, means for selecting for said remote station the antenna means for which one of its M sampled signal strengths has a magnitude greater than the magnitude of any of the M sampled signal strengths for all other antenna means;

at said second cell control means, means for comparing the magnitude of the largest sampled signal strength of the selected antenna means for said remote station to the magnitude of the largest sampled signal strength transmitted from said first cell control means; and at said second cell control means, means for assigning said remote station an RF signal channel if the largest sampled signal strength of the selected antenna means for said remote station is at least a predetermined amount greater than the largest sampled signal strength transmitted from said first cell control means.

51. The cell control means according to claim 50, wherein said sampling means of said first cell control means includes means for selecting for each antenna means the sampled signal strength having the largest magnitude, said coupling means of said first cell control means coupling the assigned RF signal receiving means for each such remote station to the antenna means for which the selected sampled signal strength has a magnitude greater than the selected sampled signal strength for all other antenna means.

52. The cell control means according to claim 50 or 51, wherein said sampling means of said second cell control means includes means for selecting for each antenna means the sampled signal strength having the larges: magnitude, said coupling means of said second cell control means coupling the assigned RF signal receiving means for said remote station to the antenna means for which the selected sampled signal strength has a magnitude greater than the selected sampled signal strength for all other antenna means.

53. The cell control means according to claim 50, wherein said comparing means of said second cell control means further includes means for adding a predetermined number to the sampled signal strength transmitted from said first cell control means, said comparing means of said second cell control means comparing the magnitude of the largest sampled signal strength of the selected antenna means to the magnitude of the sum of the predetermined number and the largest sampled signal strength transmitted from said first cell control means.

54. The cell control means according to claim 43, further including means for communicating sampled signal strengths between a first cell control means and a second cell control means, and further comprising:

at said first cell control means, means for transmitting the magnitude of the largest sampled signal strength received from a remote station by the selected antenna means to said second cell control means;

at said second cell control means, means for sampling M times the strength of the RF signal received by each antenna means from said remote station, where M is an integer number greater than one;

at said second cell control means, means for selecting for said remote station the antenna means for which one of its M sampled signal strengths has a magnitude greater than the magnitude of any of the M sampled signal strengths for all other antenna means;

at said second cell control means, means for comparing the magnitude of the largest sampled signal strength of the selected antenna means for said remote station to a predetermined magnitude; and at said second cell control means, means for assigning said remote station an RF signal channel if the magnitude of the largest sampled signal strength of the selected antenna means for said remote station is at least a predetermined amount greater than the predetermined magnitude.

55. A method of controlling radio frequency (RF) signal communications paths to remote stations of a communications system, said communications system including a plurality of cells partitioned from a geographical area; each cell allocated a predetermined number of duplex RF signal channels, and each cell including cell control means, RF signal transmitting means for transmitting RF signals at a plurality of signal frequencies, and a plurality of RF signal receiving means each couplable to a plurality of antenna means for receiving RF signals at a plurality of signal frequencies; said method performed by each of said cell control means comprising the steps of:

(a) assigning one of the RF signal channels and one of the plurality of RF signal receiving means to each requesring remote station;

(b) incrementing timers for each remote station assigned an RF signal channel by a predetermined amount at successive time intervals;

(c) re-assigning RF signal channels that were previously assigned to remote stations whose timer has a magnitude greater than a predetermined maximum magnitude;

(d) selecting a remote station whose transmitted RF signal is being received and whose timer has a magnitude greater than a predetermined minimum magnitude;

(e) sampling N times the strength of the RF signal received by each antenna means from said selected remote station, where N is an integer number greater than one; and (f) resetting the timer of said selected remote station to a predetermined initial magnitude.

56. The method according to claim 55, further including the step of:

(g) coupling the assigned RF signal receiving means for said selected remote station to the antenna means for which at least one of its N sampled signal strengths has a magnitude greater than the magnitude of any of the N sampled signal strengths for all other antenna means.

57. The method according to claim 56, further including the step of:

(h) coupling the assigned RF signal receiving means for said selected remote station to a second antenna means for which at least one of its N sampled signal strengths has a magnitude greater than the magnitude of any of the N sampled signal strengths for the remaining ones of said other antenna means.

58. The method according to claim 55, wherein at least one remote station has voice-operated transmitting means which transmits an RF signal substantially only when voice signals are applied to it; said step (c) comprising the steps of:
   (i) re-assigning RF signal channels that were previously assigned to remote stations not having voice-operated transmitting means and whose timer has a magnitude greater than a predetermined maximum magnitude; and
   (ii) transmitting a control signal to a remote station, having voice-operated transmitting means, for causing the remote station to transmit an RF signal for a predetermined time interval when its timer has a magnitude greater than the predetermined maximum magnitude.

59. The method according to claim 58, wherein said step (c) further includes the step of:
   (iii) re-assigning RF signal channels that were previously assigned to remote stations having voice-operated transmitting means and whose timer has a magnitude that is a predetermined amount greater than the predetermined maximum magnitude.

60. The method according to claim 55, further including the step of:
   (g) repeating said steps (c), (d), (e) and (f) at successive time intervals greater than the timer interval in step (b).

61. The method according to claim 58 or 59, wherein said step (ii) comprises transmitting a control signal to a remote station, having voice-operated transmitting means, for causing the remote station to transmit an RF signal for a predetermined time interval and causing the remote station to increase the strength of its transmitted RF signal, when its timer has a magnitude greater than the predetermined maximum magnitude.

62. Control means for a base station of a radio frequency (RF) signal communications system providing communications to remote stations, said communications system including a plurality of cells partitioned from a geographical area; each cell allocated a predetermined number of duplex RF signal channels, and each cell including cell control means, RF signal transmitting means for transmitting RF signals at a plurality of signal frequencies, and a plurality of RF signal receiving means each couplable to a plurality of antenna means for receiving RF signals at a plurality of signal frequencies; said cell control means comprising:
   means for assigning one of the RF signal channels and one of the plurality of RF signal receiving means to each requesting remote station;
   means for incrementing timers for each remote station assigned an RF signal channel by a predetermined amount at successive time intervals;
   means for re-assigning RF signal channels that were previously assigned to remote stations whose timer has a magnitude greater than a predetermined maximum magnitude;
   means for selecting a remote station whose transmitted RF signal is being received and whose timer has a magnitude greater than a predetermined minimum magnitude;
   means for sampling N times the strength of the RF signal received by each antenna means from said selected remote station, where N is an integer number greater than one; and
   means for resetting the timer of said selected remote station to a predetermined initial magnitude.

63. The cell control means according to claim 62, further including:
   means for coupling the assigned RF signal receiving means for said selected remote station to the antenna means for which at least one of its N sampled signal strengths has a magnitude greater than the magnitude of any of the N sampled signal strengths for all other antenna means.

64. The cell control means according to claim 63, further including:
   means for coupling the assigned RF signal receiving means for said selected remote station to a second antenna means for which at least one of its N sampled signal strengths has a magnitude greater than the magnitude of any of the N sampled signal strengths for the remaining ones of said other antenna means.

65. The cell control means according to claim 62, wherein at least one remote station has voice-operated transmitting means which transmits an RF signal substantially only when voice signals are applied to it; said re-assigning means comprising:
   means for re-assigning RF signal channels that were previously assigned to remote station not having voice-operated transmitting means and whose timer has a magnitude greater than a predetermined maximum magnitude; and
   means for transmitting a control signal to a remote station, having voice-operated transmitting means, for causing the remote station to transmit an RF signal for a predetermined time interval when its timer has a magnitude greater than the predetermined maximum magnitude.

66. The cell control means according to claim 64, wherein said re-assigning means further includes:
   means for re-assigning RF signal channels that were previously assigned to remote stations having voice-operated transmitting means and whose timer has a agnitude that is a predetermined amount greater than the predetermined maximum magnitude.

67. The cell control means according to claim 65 or 66, wherein said control signal transmitting means comprises means for transmitting a control signal to a remore station, having voice-operated transmitting means, for causing the remote station to transmit an RF signal for a predetermined time interval and causing the remote station to increase the strength of its transmitted RF signal, when its timer has a magnitude greater than the predetermined maximum magnitude.

* * * * *

UNITED STATES PATENT AND TRADEMARK OFFICE
CERTIFICATE OF CORRECTION

PATENT NO. : 4,485,486            Page 1 of 2

DATED : November 27, 1984

INVENTOR(S) : Larry C. Puhl, et al.

It is certified that error appears in the above-identified patent and that said Letters Patent is hereby corrected as shown below:

In Column 19, line 23, delete "siqnal" and insert --signal--.

In Column 22, line 40, delete "tney" and insert --they--.

In Column 22, line 41, delete "ecome" and insert --become--.

In Column 22, line 42, delete "cnannels" and insert --channels--.

In Column 23, line 28, delete "predetmined" and insert --predetermined--.

In Column 23, line 37, delete "staton" and insert --station--.

UNITED STATES PATENT AND TRADEMARK OFFICE
CERTIFICATE OF CORRECTION

PATENT NO. : 4,485,486                 Page 2 of 2

DATED : November 27, 1984

INVENTOR(S) : Larry C. Puhl, et al.

It is certified that error appears in the above-identified patent and that said Letters Patent is hereby corrected as shown below:

In Column 24, line 44, delete "staton" and insert --station--.

In Column 24, line 61, delete "predetmined" and insert --predetermined--.

Signed and Sealed this

Nineteenth Day of November 1985

[SEAL]

Attest:

DONALD J. QUIGG

Attesting Officer        Commissioner of Patents and Trademarks